United States Patent [19]

Saleh

[11] 4,326,245
[45] Apr. 20, 1982

[54] CURRENT FOLDBACK CIRCUIT FOR A DC POWER SUPPLY

[75] Inventor: Mustafa Y. M. Saleh, Margate, Fla.

[73] Assignee: Siemens Corporation, Iselin, N.J.

[21] Appl. No.: 236,857

[22] Filed: Feb. 23, 1981

[51] Int. Cl.³ .......................................... H02P 13/00
[52] U.S. Cl. ..................................... 363/79; 323/275; 363/21
[58] Field of Search ............... 323/275, 276, 277, 285; 363/20, 21, 55–57, 79, 80, 96, 97

[56] References Cited

U.S. PATENT DOCUMENTS 3,723,774  3/1973  Rogers ............................ 323/277 X
3,986,101 10/1976  Koetsch et al. ...................... 323/275
4,128,866 12/1978  Doerre ............................. 363/79 X

FOREIGN PATENT DOCUMENTS 2708021  8/1978  Fed. Rep. of Germany .

Primary Examiner—William M. Shoop
Attorney, Agent, or Firm—Spellman, Joel & Pelton

[57] ABSTRACT

A DC power supply having an input stage receiving input power at one voltage and an output stage connected to the input stage producing output power at another, output voltage. The output stage receives a control signal reducing the output voltage by a prescribed amount when the output current exceeds a given level. The control unit includes a comparator which compares the output current with a reference level and produces a current foldback signal if the output current exceeds the reference level.

6 Claims, 3 Drawing Figures

CURRENT FOLDBACK CIRCUIT FOR A DC POWER SUPPLY

BACKGROUND OF THE INVENTION

The present invention relates to a DC power supply and, more particularly, to a current foldback circuit for a DC power supply.

DC power supplies are universally used to supply a steady state DC voltage—for example, five volts or seven volts—to power an electronic circuit. Invariably, such DC power supplies receive power at another voltage, either a DC voltage at a different steady or variable voltage level or an AC voltage. Because the function of DC power supplies is thus to convert from one voltage to another, they are conventionally called "converters".

Power converters may be classified as being regulated or unregulated. Unregulated converters produce an output voltage which is dependent upon output current; regulated converters produce an output voltage which is, to some degree, independent of the output current. An example of a regulated power converter is disclosed in the German Auslegeschrift No. 27 08 021.

Within the class of regulated power converters are the so-called "switching" converters: power converters which are capable of switching between one power level and another. Typically, such converters continuously monitor their own output voltage and current to sense an overload condition. In case of an overload, the output voltage is reduced by a prescribed amount. Such switching converters include a "current foldback circuit" which triggers a reduction in output voltage when the output current reaches a fallback level, typically 25-50% above the rated current.

In switching converters having a current foldback circuit, the "foldback current" or current level at which foldback occurs, must be substantially greater than the rated current. Current foldback circuits known in the art are unable to discriminate low percentages above rated current. Such circuits are also relatively complex and expensive.

SUMMARY OF THE INVENTION

An object of the present invention is to provide a current foldback circuit for a switching converter which is capable of discriminating foldback currents that are a small percentage (e.g. 5-10%) above rated current.

It is a further object of the present invention to provide a current foldback circuit for a switching converter which is relatively simple and inexpensive as compared to known circuits in the prior art.

It is another object of the present invention to provide a current foldback circuit for a switching converter in which the moment of current foldback is synchronized with a periodic switching signal, for example the signal employed in the switching converter to switch a transistor on and off.

It is still another object of the present invention to provide a current foldback circuit for a switching converter in which the foldback current is maintained at a constant level, notwithstanding variations in the input voltage to the switching converter.

These objects, as well as other objects which will become apparent from the discussion that follows are achieved, according to the present invention, by providing a control circuit operative to produce a control signal for varying the output voltage of a switching converter. This control circuit comprises, as principle elements, a differential amplifier having two inputs and an output for producing the control signal; a voltage divider having two resistors connected in series with the center terminal between the two resistors connected to one input of the differential amplifier; an output voltage sensing means, connected to the other input of the differential amplifier, for producing a signal representative of the output voltage of the switching converter; a first reference voltage source connected to one end terminal of the resistor series; a comparator having two inputs and an output connected to the other end terminal of the resistor series; a second reference source connected to one input of the comparator; and an output current sensing means, connected to the other input of the comparator, for producing a signal representative of the output current supplied by the switching converter. With this control circuit, the current produced by the switching converter is continuously monitored and causes the comparator to change its state when the current exceeds a prescribed threshold (determined by the voltage level of the second voltage source). When the comparator changes its state, it connects one terminal of the resistor series to ground, thus changing the voltage applied to one input of the differential amplifier. When this occurs, the control signal maintains the output voltage of the switching converter at a different (reduced) output voltage.

For a full understanding of the present invention, reference should now be made to the following detailed description of one preferred embodiment of the invention and to the accompanying drawings.

DESCRIPTION OF THE PREFERRED EMBODIMENTS

Figure 1:
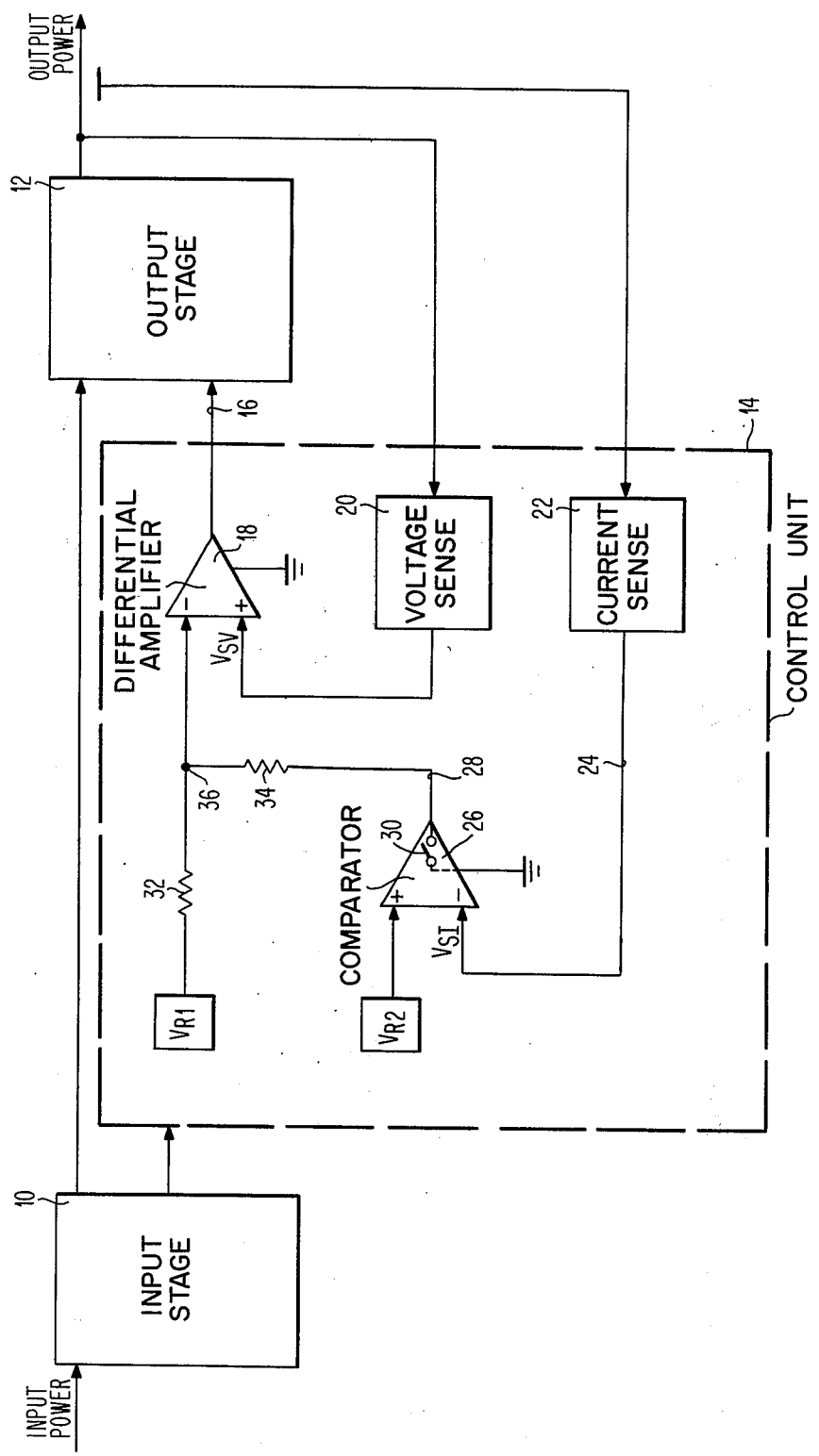
FIG. 1 is a block diagram of a DC power supply showing the structure of the current foldback circuit according to the present invention.

The preferred embodiments of the present invention will now be described with reference to FIGS. 1-3 of the drawings. Identical elements shown in the various figures are designated with the same reference numerals.

FIG. 1 shows a DC power supply consisting generally of an input stage 10, an output stage 12 and a control unit 14. The input stage 10 receives input power at one voltage and distributes this power at the same or a different voltage to the output stage 12 and control unit 14. The output stage 12 produces output power at a prescribed DC voltage level which is different from the input voltage. For example, the input voltage may be an AC voltage having an RMS value of 12 V, whereas the output voltage may be 5 V DC. The output voltage level is dependent upon a control signal supplied to the output stage via a control input line 16. This control signal is produced by a differential amplifier 18 which continuously compares the output voltage produced by the output stage with a reference voltage $V_{R1}$. The output voltage is monitored by a voltage sensor 20 which may, for example, be simply a voltage divider. The output of this voltage sensor is applied as an analog voltage $V_{SV}$ to the positive input of the differential amplifier and this amplifier produces an "error" signal, either positive or negative, depending upon the difference between the output of the voltage sensor 20 and the reference voltage $V_{R1}$. This error signal is passed as the control signal to the output stage 12.

The output current produced by the output stage is continuously monitored by a current sensor 22 which may, for example, comprise a voltage divider. An analog voltage $V_{SI}$, representative of the output current, is passed on a line 24 to the negative input of a comparator 26. If this voltage is less than a reference voltage $V_{R2}$, the comparator produces a "zero" output which is effectively an open circuit on the output line 28 (as indicated by the open switch 30). However, if the voltage $V_{SI}$ on line 24 exceeds the reference voltage $V_{R2}$, the comparator produces a "one" output by effectively closing the switch 30 and connecting the output line 28 to ground. When this occurs, the reference voltage $V_{R1}$ is divided by the voltage divider formed by the series resistors 32 and 34. In this way, the voltage supplied to the negative input terminal of the differential amplifier 18 from the center terminal 36 between the two series resistors is abruptly lowered, thus producing a negative error signal on line 16 which reduces the voltage produced by the output stage 12.

Figure 2:
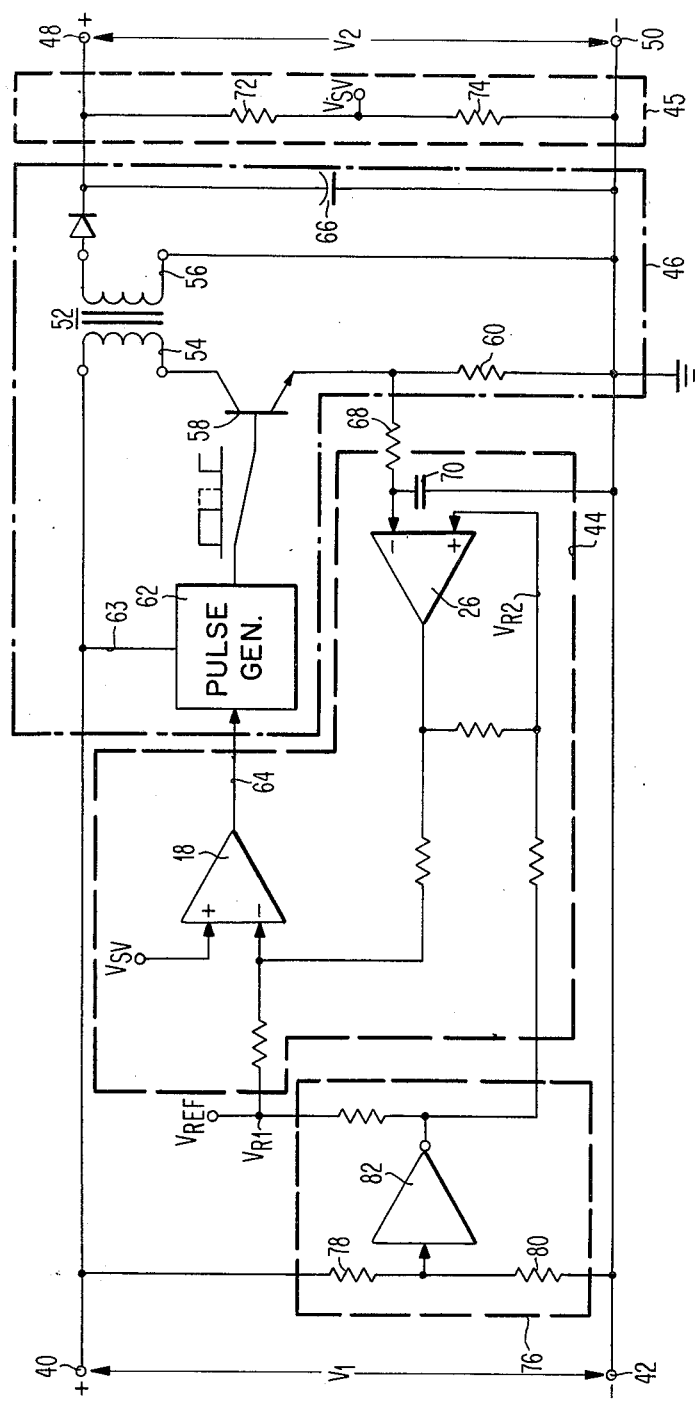
FIG. 2 is a schematic diagram of a DC to DC switching converter having a current foldback circuit according to one preferred embodiment of the present invention.

FIG. 2 is a schematic diagram of an actual circuit which operates according to the principles described above in connection with FIG. 1. In this circuit, DC power with a voltage $V_1$ is applied to the input terminals 40 and 42. This power is utilized to operate the control unit 14 indicated, in part, by the L-shaped box 44 in dashed lines, and the output stage 12 indicated by the L-shaped box 46 in dotted-dashed lines. The voltage sensor 20, which is part of the control unit 14, is also indicated by a box 45 in dashed lines.

Whereas the input stage effects no conversion of the input voltage, the output stage converts the input voltage $V_1$ into a different, output voltage $V_2$ which appears at the output terminals 48 and 50. To this end, the output stage comprises a suitable transformer 52 having a primary 54 and secondary 56. A voltage is intermittently applied across the terminals of the primary via a power switching transistor 58 and a low value sensing resistor 60 connected to ground. The switching transistor is controlled by a pulse generator 62 that receives power via line 63 and produces pulses of a prescribed frequency and variable pulse width. The pulse width or duty cycle of the pulses produced by the pulse generator is controlled by a voltage applied via a line 64. The duty cycle determines the length of time, during each cycle, that current is allowed to pass through the primary 54 of the transformer 52 to charge a storage capacitor 66 connected across the output terminals 48 and 50.

The control unit indicated in the box 44 operates in the manner described above in connection with FIG. 1. The comparator 26 senses the difference between the reference voltage $V_{R2}$ applied to its positive input terminal and the current sense voltage $V_{SI}$ applied to its negative input terminal. The voltage $V_{SI}$ is proportional to the current I passing through the transistor 58 and the sensing resistor 60. An RC filter consisting of a resistor 68 and a capacitor 70 smooths the voltage $V_{SI}$ over several cycles. Thus, the RC time constant for the resistor 68 and capacitor 70 must be equal to or greater than the period of one cycle.

The voltage sensor indicated within the box 45 in FIG. 2 comprises a voltage divider with resistors 72 and 74. The output voltage $V_{SV}$ is applied to the positive input terminal of the differential amplifier 18.

A single reference voltage $V_{REF}$ is used to derive the reference voltages $V_{R1}$ and $V_{R2}$ for the differential amplifier 18 and comparator 26, respectively. According to a particular feature of the invention, a circuit is provided as indicated within the dashed lines 76, which varies the reference voltage $V_{R2}$ in accordance with the input voltage $V_1$. This circuit 76 comprises a voltage divider consisting of resistors 78 and 80 and an inverting amplifier 82. The circuit operates in such a way that when the voltage $V_1$ increases, the reference voltage $V_{R2}$ applied to the comparator 26 is reduced so as to compensate for the lower average current flowing through the transistor 58.

Figure 3:
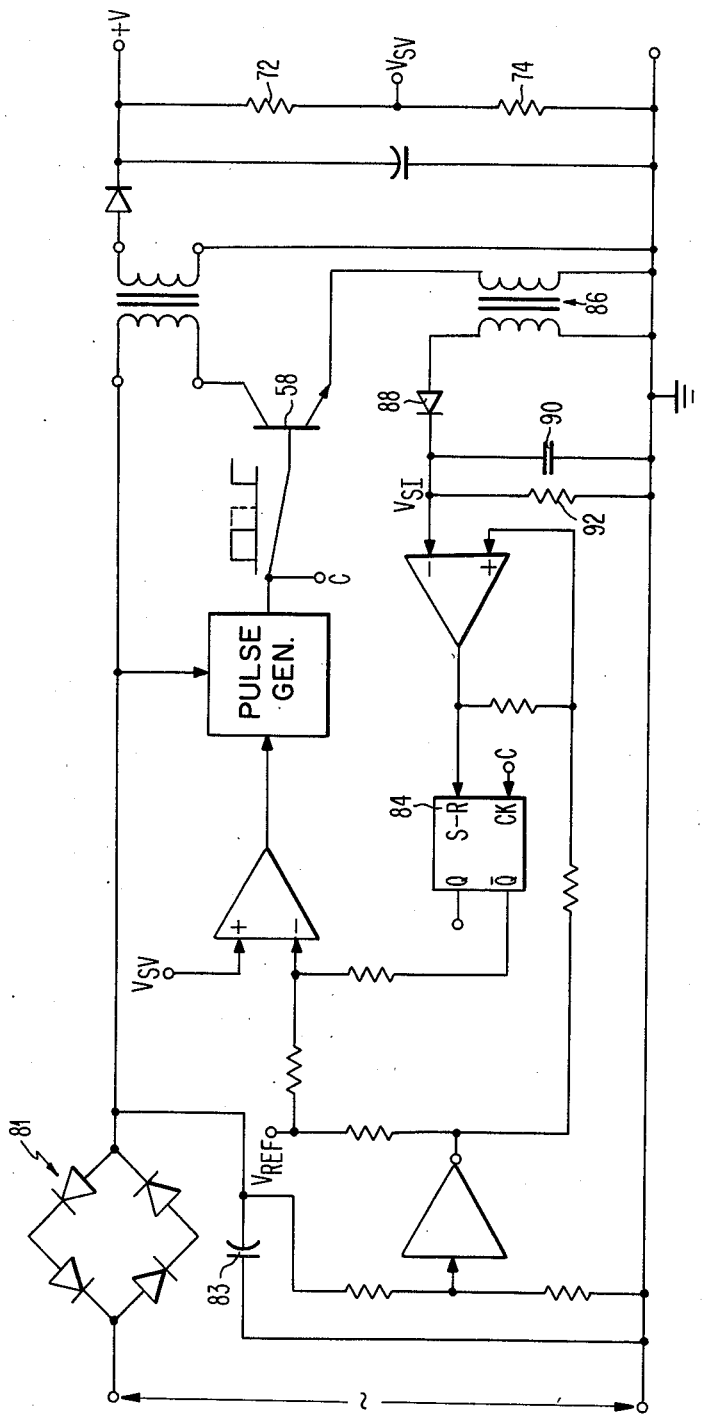
FIG. 3 is a schematic diagram of an AC to DC switching converter with a current foldback circuit according to a second preferred embodiment of the present invention.

FIG. 3 illustrates a circuit very similar to that shown in FIG. 2, but with a few modifications. In this circuit, the input stage comprises a rectifier 81 and capacitor 83 for transforming an AC input voltage into a DC supply. In addition, a flip-flop 84 is provided to synchronize the current foldback with the leading edge of the pulses produced by the pulse generator 52 controlling the switching transistor 58. This arrangement prevents a change in the control input of the pulse generator at mid-cycle from confusing the pulse generator.

In still another modification, the current sensor comprises a small transformer 86 which is capable of passing high current with low resistance. This sensor also comprises a diode 88 and a filter formed of a capacitor 90 and resistor 92 connected in parallel.

There has thus been shown and described a novel current fallback circuit for a DC power supply which fulfills all the objects and advantages sought therefore. Many changes, modifications, variations and other uses and advantages of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be included in the invention which is limited only by the claims which follow.

What is claimed is:

1. A DC power supply comprising:
   a. input means for receiving input power at an input voltage;
   b. output means, connected to said input means, for producing output power at another, output voltage, said output means having a control input and being responsive to a control signal applied to said control input to vary said output voltage; and
   c. control means, connected to said output means, for producing said control signal, said control means including:
      1. a differential amplifier having first and second inputs and an output connected to said control input of said output means, said differential amplifier producing said control signal at said output thereof;
      2. a voltage divider circuit having two resistors connected in series with a first terminal at one end of the resistor series, a second terminal at the opposite end of the resistor series and a center terminal between the two resistors, said center terminal being connected to said first input of said differential amplifier;
3. output voltage sensing means, connected to said second input of said differential amplifier, for producing a signal representative of said output voltage;
4. a first reference voltage source connected to said first terminal of said resistor series;
5. a comparator, capable of assuming two logic states and having first and second inputs and an output connected to said second terminal of said resistor series, said comparator (1) assuming a first logic state and connecting said second terminal to ground if the voltage applied to said second input thereof exceeds the voltage applied to said first input thereof, and (2) assuming a second logic state and providing an open circuit to said second terminal if the voltage applied to said second input thereof is less than the voltage applied to said first input thereof;
6. a second reference voltage source connected to said first input of said comparator; and
7. output current sensing means, connected to said second input of said comparator, for producing a signal representative of the output current supplied by said output means at said output voltage;
whereby said output voltage is reduced by a prescribed amount when the voltage applied to the second input of said comparator exceeds the voltage applied to the first input thereof.

2. The DC power supply recited in claim 1, wherein said output means comprise:
(1) a DC voltage input connected to said input means;
(2) a DC voltage output;
(3) transformer means having a primary winding and a secondary winding, each having two leads, one lead of said primary winding being connected to said voltage input, one lead of said secondary winding being connected to said voltage output, and the other lead of said secondary winding being connected to ground;
(4) a transistor connected with its emitter and collector between the other primary lead and ground; and
(5) pulse generator means coupled to said transistor for producing a pulse train of defined duty cycle for periodically switching said transistor on and off, said pulse generator having a control input for varying said duty cycle.

3. The DC power supply recited in claim 2, wherein said output current sensing means comprises a current sensing resistor connected between said transistor and ground and a voltage filter connected across said sensing resistor.

4. The DC power supply recited in claim 2, wherein said output current sensing means comprises:
   i. second transformer means having a primary winding and a secondary winding, said primary winding being connected between said transistor and ground; and
   ii. a voltage filter connected across said secondary winding of said second transformer.

5. The DC power supply recited in claim 2, further comprising a flip-flop connected between said output of said comparator and said second terminal, said flip-flop having a clock input connected to receive said pulse train.

6. The DC power supply recited in claim 1, further comprising voltage inverter means connected between said input means and said first and second reference voltage sources to reduce said first and second reference voltages in response to an increase in input voltage and vice versa.

* * * * *